(12) United States Patent
Sbuell et al.

(10) Patent No.: US 7,868,481 B2
(45) Date of Patent: Jan. 11, 2011

(54) EMERGENCY CAPACITOR FOR A CONTACTLESS DEVICE

(75) Inventors: Richard Sbuell, Graz (AT); Walter Kargl, Graz (AT); Albert Missoni, Graz (AT)

(73) Assignee: Infineon Technologies AG, Neubiberg (DE)

( * ) Notice: Subject to any disclaimer, the term of this patent is extended or adjusted under 35 U.S.C. 154(b) by 157 days.

(21) Appl. No.: 11/942,436

(22) Filed: Nov. 19, 2007

(65) Prior Publication Data
US 2009/0127934 A1 May 21, 2009

(51) Int. Cl.
*H02J 9/00* (2006.01)
(52) U.S. Cl. ............. 307/66; 307/64; 307/48; 307/104
(58) Field of Classification Search ............ None
See application file for complete search history.

(56) References Cited

U.S. PATENT DOCUMENTS

| | | | | |
|---|---|---|---|---|
| 5,345,231 A | * | 9/1994 | Koo et al. ............ | 340/870.31 |
| 6,153,949 A | * | 11/2000 | Soderhall ............ | 307/66 |
| 6,301,138 B1 | * | 10/2001 | Amtmann ............ | 363/126 |
| 6,703,921 B1 | * | 3/2004 | Wuidart et al. ........ | 340/10.4 |
| 2003/0156436 A1 | * | 8/2003 | Moreaux et al. ....... | 363/49 |
| 2009/0127934 A1 | * | 5/2009 | Sbuell et al. ......... | 307/66 |

FOREIGN PATENT DOCUMENTS

GB     233495 A  *  7/1999

* cited by examiner

*Primary Examiner*—Fritz M Fleming
(74) *Attorney, Agent, or Firm*—Dickstein Shapiro LLP

(57) ABSTRACT

A power supply for a contactless device having a power supply circuit configured to provide an internal power supply voltage, an emergency capacitor circuit having an emergency capacitor, configured to provide a source current during an external field pause, and a power supply regulator configured to regulate the internal power supply voltage and the source current, wherein the emergency capacitor circuit is electrically coupled in parallel with the power supply circuit.

16 Claims, 2 Drawing Sheets

EMERGENCY CAPACITOR FOR A CONTACTLESS DEVICE

BACKGROUND OF THE INVENTION

The present invention is directed generally to an emergency capacitor in a contactless card.

The basic components of a contactless card system are a contactless reader and the contactless card. The contactless reader, also known as a PCD, includes an antenna electrically coupled to an electronic circuit. The contactless card, also known as a smart card, a tag, a PICC, or an RFID card, has an inductive antenna and an integrated circuit electrically coupled to the inductive antenna.

When the contactless card penetrates a transmission field of the reader, the reader antenna transmits to the contactless card a carrier signal, which generates a radio frequency (RF) field to supply the contactless card with power, and data, which is achieved by amplitude modulation of the carrier signal. In return, the contactless card transmits data by load modulating the carrier signal. This load modulated signal is detected by the reader antenna. The communication between the reader and the contactless card may be defined for example by ISO (International Organization for Standardization) 14443, Type A/B/C.

The ISO 14443 Type A communication protocol uses amplitude-shift keying (ASK) with a reader to contactless card modulation index of up to 100%. A single bit of data is coded as a field pause in the transmission. During the pause, the carrier field emitted by the reader antenna is reduced by the modulation index. At a modulation index of 100%, the carrier field is therefore turned off during a pause, which can last several microseconds. Since the emitted field of the reader antenna is also used to transfer energy to the contactless card, the contactless card is not supplied with energy during this time interval. An energy reservoir, such as an emergency capacitor, therefore has to be added to the contactless card to provide the energy consumed by the contactless card circuitry during the pause.

FIG. 2 shows a circuit diagram 200 of a portion of a contactless card including an emergency capacitor circuit. In cards implementing a load independent antenna interface, the emergency capacitor 246 is electrically coupled directly to a main rectifier 244 of the card. A serial regulator 252, which generates the internal supply voltage VDD, is electrically coupled to the output of the rectifier 244. The emergency capacitor 246 is charged by the main rectifier 244 with a charge current $I_{charge}$, and discharged by the main current source 248 with a discharge current $I_{discharge}$.

A voltage across the emergency capacitor 246 at node VDDRF equals the antenna voltage VLA/LB minus the voltage drop at the main rectifier 244. The voltage drop at the main rectifier 244 increases with increasing rectifier load current $I_{AVG}$, so the voltage at the emergency capacitor 246 and the charge stored, is dependent on the chip-load current.

VDDMID shunt 250 discharges the emergency capacitor 246 when the voltage VDDRF at the emergency capacitor 246 is higher than a target regulation voltage VDDMID of the VDDMID shunt 250. The discharge current $I_{discharge}$ of the emergency capacitor 246 is limited by the main current source 248. As the current consumed by main current source 248 is much larger than the current consumed by the VDD regulator 252 during a communication phase, most of the current from the emergency capacitor 246 is shunted through VDDMID shunt 250.

In normal operation, the contactless card antenna receives a carrier signal from the reader antenna generating a current on antenna 210. The main rectifier 244 is turned on, and the emergency capacitor 246, electrically coupled to the output of the main rectifier 244, is charged to the main rectifier output voltage at node VDDRF. During a 100% Type A field pause, the contactless card does not receive a carrier signal generating an induced voltage at the antenna 210. The main rectifier 244 turns off as the contactless card antenna voltage VLA/LB drops below the output voltage VDDRF of the main rectifier 244. During this time the current consumed by the contactless card circuitry is delivered by the emergency capacitor 246. Also, the emergency capacitor 246 will be discharged by the VDDMID shunt 250 in the VDD supply path during a 100% Type A pause. As a consequence the internal supply voltage VDD drops and a low voltage reset is triggered.

BRIEF SUMMARY OF THE INVENTION

A power supply for a contactless device having a power supply circuit configured to provide an internal power supply voltage, an emergency capacitor circuit having an emergency capacitor, configured to provide a source current during an external field pause, and a power supply regulator configured to regulate the internal power supply voltage and the source current, wherein the emergency capacitor circuit is electrically coupled in parallel with the power supply circuit.

DETAILED DESCRIPTION OF THE INVENTION

The present invention is described as a contactless card with an emergency capacitor circuit electrically coupled in parallel with a power supply circuit. The contactless card has a chip-load independent antenna interface. The emergency capacitor circuit is adaptively charged by a charge limiter circuit limiting a charge current of the emergency capacitor to an amount of available field strength. The emergency capacitor circuit is also adaptively discharged in that current delivered by the emergency capacitor circuit is equal to a current consumed by a supply voltage regulator included within the regulated power supply circuit during communication. However, the disclosed emergency capacitor circuit can be used in any application where there is a brief power supply interruption.

Figure 1:
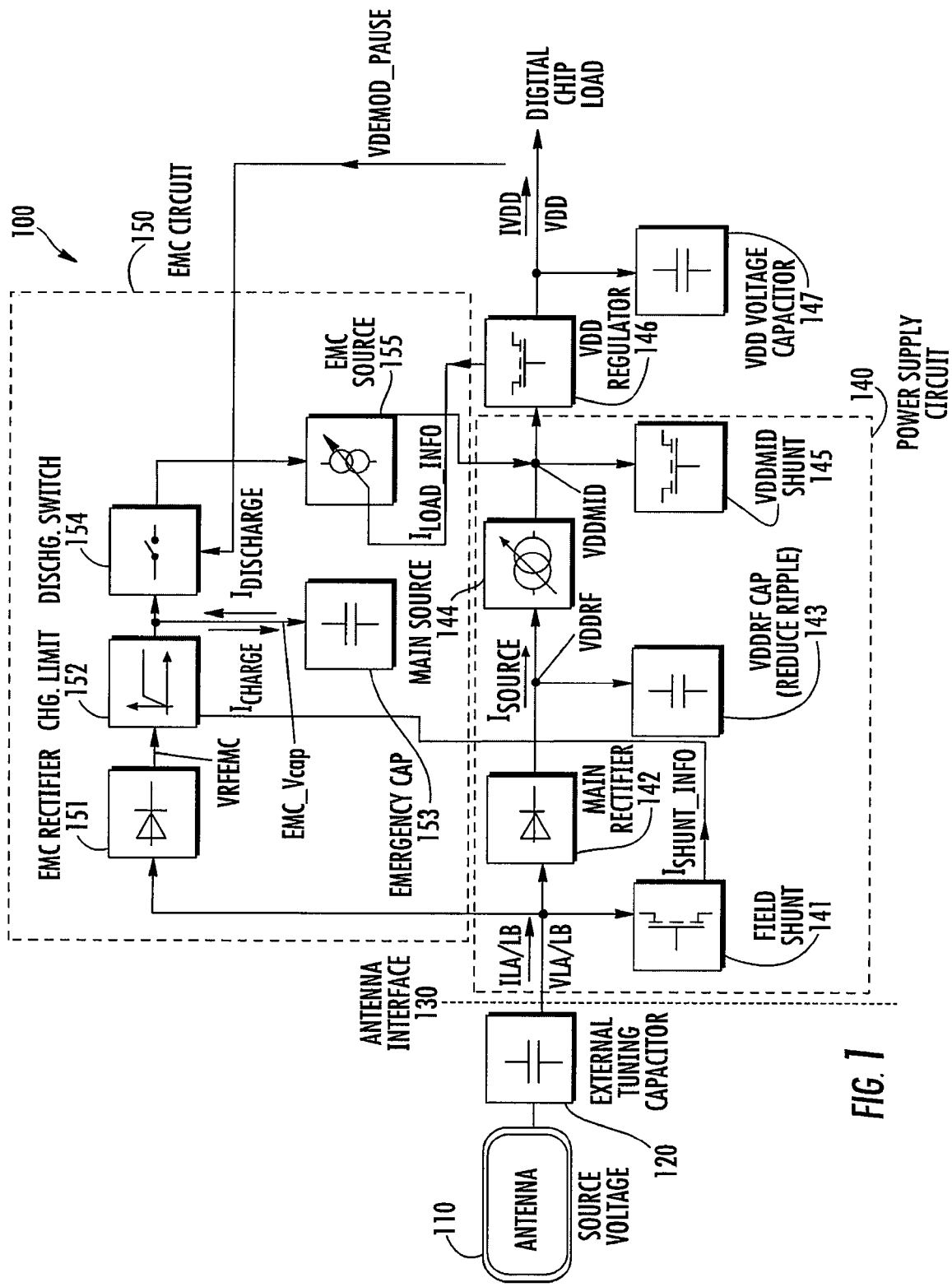
FIG. 1 is a circuit diagram of a portion of a contactless card including an emergency capacitor circuit according to an embodiment of the present invention.
Figure 2:
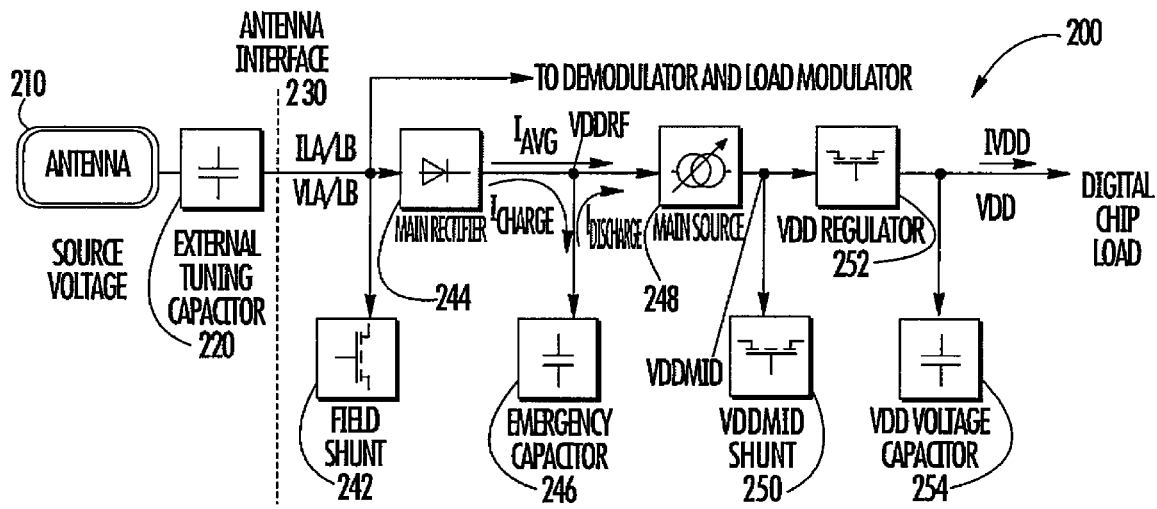
FIG. 2 is a circuit diagram of a portion of a contactless card including an emergency capacitor circuit.

FIG. 1 is a circuit diagram 100 of a portion of a contactless card including an emergency capacitor circuit 150 electrically coupled in parallel with a power supply circuit 140 in accordance with an embodiment of the present invention. The contactless card implements a chip-load independent antenna interface.

When the contactless card penetrates a transmission field a reader (not shown), the antenna circuit, including antenna 110 and external tuning capacitor 120, receives a carrier signal transmitted by the reader. The carrier signal induces a current in the antenna and supplies the contactless card with data and power. The antenna 110 is tuned by an external tuning capacitor 120 to a voltage at node VLA/LB at the antenna interface 130 and the input to a main rectifier 142. A field shunt 141 connected at node VLA/LB limits the voltage at this node. The main rectifier 142 converts the alternating antenna current ILA/LB into a unidirectional current $I_{source}$ to be supplied to main current source 144, which in turn supplies current to an internal power supply regulator, VDD regulator 146. The VDD regulator 146 supplies the contactless card with an internal power supply voltage VDD. VDD voltage capacitor 147 reduces ripple in the internal power supply voltage VDD. While VDD regulator 146 is shown as a series element, other embodiments can use shunt regulator elements.

In normal operation, the VDD regulator 146 of the contactless card is supplied by the main rectifier 142 and a main current source 144. The VDDMID shunt transistor 145 limits the voltage at the VDDMID node. The VDDRF capacitor 143 has no emergency charge functionality for supplying the contactless card during a field pause; it functions merely to reduce the ripple of the voltage at VDDRF node and thus is relatively small. The emergency capacitor circuit 150 can be viewed as a parallel supply path for the power supply circuit 140. Respective input terminals of the emergency capacitor circuit 150 and the power supply circuit 140 are coupled directly at an input node VLA/LB, and respective output terminals of the emergency capacitor circuit and the power supply circuit are coupled directly at an output node VDDMID. During normal operation, the emergency capacitor 153 is charged with charge current $I_{charge}$ by the emergency capacitor (EMC) rectifier 151, which is connected at the antenna interface at node VLA/LB. A charge limiter circuit 152, which is connected between the EMC rectifier 151 and the emergency capacitor 153, limits the charge current $I_{charge}$ of the emergency capacitor 153 in order to decrease a rise time of a rising edge of a field pause, as explained in more detail below. In one embodiment, the limit of the charge current $I_{charge}$ is derived from the external field strength available to the contactless card. The charge current limit is provided by the current actually shunted by field shunt 141. The current through the field shunt 141 is a function of external field strength received by the contactless card, and the amount of shunted current is provided to the charge limiter 152 via signal $I_{shunt\_info}$.

During normal operation, the emergency capacitor 153 is only charged, not discharged. Discharge is prevented by discharge switch 154, as is explained in more detail below. Since no current is drawn from the emergency capacitor 153 at node $EMC\_V_{cap}$, the voltage drop at the EMC rectifier 151 is rather small and the voltage at the emergency capacitor 153 will be increased by 1.5 to 4.5V as compared to previous emergency capacitors.

The contactless card supply and the emergency capacitor 151 rectifier are separated. The emergency capacitor 153 is therefore not discharged in normal operation, which increases the voltage at the emergency capacitor 151. By increasing the capacitor voltage, the size of the emergency capacitor 151 can be reduced by keeping the amount of charge stored constant. As a result there is a reduction in chip area.

As the charge stored in the emergency capacitor 153 equals a product of the capacitance of the emergency capacitor 153 and the voltage at the emergency capacitor 153, the capacitance of the emergency capacitor 153 can be reduced, if the voltage $EMC\_V_{cap}$ at the emergency capacitor 153 increases. By increasing the voltage by 1.5V, which is about a 30% increase, the capacitance can be reduced by 30% for storing the same amount of charge as previous emergency capacitors. Also, discharging the emergency capacitor 153 only during a field pause increases the area efficiency of the emergency capacitor circuit 150 by about 30%.

During a communication operation, the emergency capacitor circuit 150 becomes active, that is, it delivers energy to the VDDMID node. The amount of energy delivered preferably equals an amount of current consumed by the VDD regulator 146 from the VDDMID node during communication. The current actually consumed by the VDD regulator 146 is provided to an EMC source 155 by a signal $I_{load\_info}$. During sleep mode the current consumption of the VDD regulator 146 will be a few hundred microamperes. The current of the main current source 144 adapts to the external field strength. In the case of strong field, the current is adjusted in the range of 10 to 15 milliamperes. By entering sleep mode, current decreases dramatically and most of the current delivered to the VDDMID node by the main current source 144 is shunted by the VDDMID shunt transistor 145, and only a few hundred microamperes are consumed by the VDD regulator 146.

During a modulation pause, such as a Type A field pause, the external field strength received by the contactless card becomes zero. The main rectifier 142 turns off. The VDDRF capacitor 143 is rapidly discharged by the main current source 144, which current is preferably set to 15 mA, as it is in a strong field. Most of the current delivered by the VDDRF capacitor 143 is shunted by VDDMID shunt 145, as the VDD regulator 146 only consumes a few hundred microamperes from the VDDMID node.

As discussed above, the discharge current $I_{discharge}$ of the emergency capacitor 153 adapts to the current consumed by the VDD regulator 146. At the falling edge of the field pause the demodulator (not shown) detects the pause. A vdemod_pause signal transmitted from the demodulator to the discharge switch 154 will become high, and the discharge switch 154 will turn on. In the meantime, the VDDRF capacitor 143 is already discharged and the voltage at node VDDRF equals the voltage at node VDDMID. The VDDMID shunt 145 turns off as the voltage at node VDDMID falls below a predetermined threshold level. By turning on the discharge switch 154, the emergency capacitor circuit 150 delivers current to the VDDMID node. As the current delivered by the emergency capacitor 153 equals the current consumed by the VDD regulator 146, the voltage at node VDDMID will not increase and the VDDMID shunt 145 will not turn on. The charge stored in the emergency capacitor 153 and delivered to the VDDMID node is not shunted, but fully delivered to the VDD regulator 146.

In this embodiment the discharge current $I_{discharge}$ of the emergency capacitor 153 adapts to the current consumed by the VDD regulator 146. However, in another embodiment, the discharge current of the emergency capacitor is adapted to the current drawn by the circuit it powers.

At the rising edge of the pause, the demodulator (not shown) will detect the end of the pause. As a result the vdemod_pause signal transmitted from the demodulator to the discharge switch 154 will become low, and the discharge switch 154 will turn off. Discharging the emergency capacitor 153 is stopped immediately. As a result of increasing field strength, the main rectifier 142 as well as EMC rectifier 151 turns on. The emergency capacitor 153 is then recharged. The emergency capacitor charge current limit is derived from, and therefore adapts to, the field strength available. As a result, the emergency capacitor 153 is recharged slowly, and the rising edge of the Type A pause is shortened, even in the case if a weak or medium external field strength, thereby increasing the communication performance in weak to medium field strength cases. Also, since no current is discharged from the emergency capacitor 153 during normal operation, the emergency capacitor voltage EMC_Vcap is increased by 1.5V to 4.5V, which causes the charge stored in the emergency capacitor 153 to increase.

The emergency capacitor circuit 150 of the present invention may be integrated into contactless cards with a chip-load independent antenna interface. The emergency capacitor circuit 150 helps improve communication performance in contactless communications with field pauses due to the adaptive charge current, and improves efficiency of the emergency capacitor circuitry due to the exclusive emergency capacitor rectifier and the discharge control by the pause signal of the demodulator. The emergency capacitor circuit 150 can be used in any application where power is required to be maintained during brief periods.

The present invention is not limited to contactless cards communicating in accordance with ISO 14443 Type A. The invention is applicable to contactless cards in which communications with the reader include a field pause.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A power supply for a contactless device comprising:
    a power supply circuit configured to provide an internal power supply voltage;
    an emergency capacitor circuit having an emergency capacitor, configured to provide a source current during an external field pause,
    wherein the emergency capacitor circuit is electrically coupled in parallel with the power supply circuit such that respective input terminals of the emergency capacitor circuit and the power supply circuit are coupled directly at an input node and respective output terminals of the emergency capacitor circuit and the power supply circuit are coupled directly at an output node, and
    a power supply regulator coupled at the output node and configured to regulate the internal power supply voltage and the source current.

2. The power supply of claim 1, wherein the power, supply circuit further comprises a main rectifier circuit configured to rectify an input voltage of the contactless card, wherein the emergency capacitor is electrically coupled to the main rectifier circuit indirectly via at least one active element.

3. The power supply of claim 2, wherein the emergency capacitor circuit further comprises an emergency capacitor rectifier configured to rectify a voltage input to the emergency capacitor.

4. The power supply of claim 1, wherein the power supply circuit comprises a field shunt configured to limit a voltage at an input, and the emergency capacitor is not discharged by the field shunt during an external field pause.

5. The power supply of claim 1, wherein the emergency capacitor circuit further comprises an emergency capacitor rectifier configured to rectify a voltage input to the emergency capacitor.

6. The power supply of claim 1, wherein the emergency capacitor circuit further comprises a switch, which is electrically coupled between the emergency capacitor and the power supply regulator, and is configured to prevent the emergency capacitor from supplying the power supply regulator with the source current when the switch is in an open position.

7. The power supply of claim 6, wherein the power supply circuit further comprises a demodulator, which is configured to detect a beginning of an external field pause and provide a field pause signal to the switch, the field pause signal causing the switch to switch to a closed position and allow the emergency capacitor to supply the power supply regulator with the source current.

8. The power supply of claim 6, wherein the power supply circuit further comprises a demodulator, which is configured to detect an end of an external field pause and to stop providing a field pause signal to the switch, thereby causing the switch to switch to an open position and immediately prevent the emergency capacitor from supplying the power supply regulator with the source current.

9. The power supply of claim 1, wherein the emergency capacitor circuit further comprises a charge limiter configured to limit a charge current of the emergency capacitor as a function of an external field strength available to the contactless card.

10. The power supply of claim 9, wherein the power supply circuit further comprises a field shunt configured to provide the charge limiter with a shunted current signal, which is based on the external field strength available to the contactless card.

11. The power supply of claim 1, wherein the emergency capacitor circuit further comprises a switch configured to prevent the emergency capacitor from discharging.

12. The power supply of claim 1, wherein the emergency capacitor circuit further comprises a current source which is configured to provide the power supply circuit with an amount of current substantially equal to an amount of current consumed by the power supply regulator during a communication mode.

13. The power supply of claim 12, wherein the internal power supply regulator is configured to provide the current source with a current load signal which indicates the amount of current consumed by the power supply regulator during the communication mode.

14. The power supply of claim 1, wherein the contactless device communicates with a reader in accordance with ISO 1443, Type A.

15. The power supply of claim 1, wherein the power supply regulator is electrically coupled in series between the power supply circuit or the energy capacitor circuit and a load.

16. A power supply for a contactless device comprising:
    a power supply circuit for providing an internal power supply voltage;
    an emergency capacitor circuit, which has an emergency capacitor, for providing a source current during an external field pause,
    wherein the emergency capacitor circuit is electrically coupled in parallel with the power supply circuit such that respective input terminals of the emergency capacitor circuit and the power supply circuit are coupled directly at an input node and respective output terminals of the emergency capacitor circuit and the power supply circuit are coupled directly at an output node, and
    a power supply regulator, coupled at the output node, for regulating the internal power supply voltage and the source current.

\* \* \* \* \*